Patented Sept. 15, 1953

2,652,395

UNITED STATES PATENT OFFICE 2,652,395

N-(C MERCAPTO-PYRIMIDYL)-P-AMINO-BENZENESULFONAMIDES

William A. Lott, Maplewood, and Frank H. Bergeim, Highland Park, N. J., assignors to Mathieson Chemical Corporation, New York, N. Y., a corporation of Virginia No Drawing. Application June 21, 1951, Serial No. 232,882

5 Claims. (Cl. 260—239.75)

This invention relates to, and has for its object the provision of: (A), N-(C-mercapto-pyrimidyl)-p-aminobenzene-sulfonamides; (B), N-(C-mercapto-pyrimidyl) - p - nitrobenzene-sulfonamides; (C), S-(heavy metal) derivatives of (A); (D) salts of (A) with bases; (E) salts of (C) with bases; and (F) methods of producing (A), (B), (C), (D), (E). These compounds are promising therapeutic agents, the S-(heavy metal) derivatives (C) and salts (E) being preferred because of their combination of chemotherapeutic action of the sulfonamides with the therapeutic action of the heavy metals.

Among the (A) and (B) compounds, those having the general formula

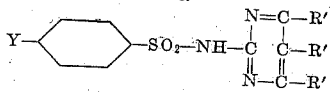

wherein Y is a member of the class consisting of nitro, amino, and acetamido groups, at least one R' represents —SH and each remaining R' is a member of the class consisting of hydrogen and lower alkyl groups, are also preferred.

A representative compound having the combined chemotherapeutic action referred to hereinbefore, has the following structural formula:

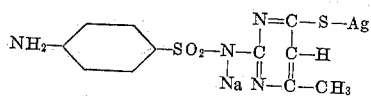

The compounds of this invention may be conveniently prepared by the method which essentially comprises reacting a compound of the general formula:

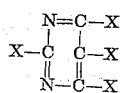

with an alkali-metal hydrosulfide in a substantially-dry organic solvent for the reactants, wherein one X in the general formula is a member of the class consisting of p-nitrobenzenesulfonamido and p-acetamidobenzenesulfonamido radicals, at least one X is a halo group, and each remaining X is a member of the class consisting of hydrogen and lower alkyl groups, and recovering the resulting mercapto-pyrimidyl compound. Preferably, the reaction takes place at no higher than 100° C. The amino compounds of this invention are obtained from the corresponding nitro compounds by reduction.

Compounds (C) are prepared by reacting the compound (A) in solution with an inorganic salt of a heavy-metal in a solvent for the reactants.

Compounds (D) and (E) are prepared by reacting compound (A) and (C) respectively with a base; e. g., an alkali-metal (including ammonium), an alkaline-earth-metal or organic-ammonium hydroxide.

The term "heavy-metal" as employed herein includes the heavy non-metals of metallic character, such as arsenic.

The substantially-dry organic solvent for the reactants includes, inter alia, lower aliphatic alcohols (e. g., absolute alcohol), ether alcohols (e. g., methoxyethanol), and ethers (e. g., dioxane).

The following examples are illustrative of the invention:

EXAMPLE 1

*Preparation of N-(6-mercapto-4-methyl-2-pyrimidyl)-p-nitrobenzenesulfonamide*

To 10 g. of N - (6-chloro-4-methyl-2-pyrimidyl)-p-nitrobenzenesulfonamide [J. Chem. Soc. 689–92 (1945)], in 20 parts, by weight, of boiling absolute alcohol, is added 7.3 g. sodium sulfhydrate in 63 ml. absolute alcohol during a period of about one hour. This mixture is refluxed for about one hour, the alcohol is removed (by distillation) and the resultant orange powder is stirred with 167 ml. of 10% hydrochloric acid. The crude N - (6 - mercapto-4-methyl-2-pyrimidyl)-p-nitrobenzenesulfonamide, which remains undissolved in the acid solution, is collected on a filter, and washed with water. It can then be purified by dissolving in dilute sodium hydroxide solution, filtering, precipitating with dilute acetic acid, to produce the purified yellow crystalline powder, melting at about 195–197° C.

EXAMPLE 2

*Preparation of N - (6-mercapto-4-methyl-2-pyrimidyl)-p-amino-benzenesulfonamide*

20 g. of N - (6 - mercapto-4-methyl-2-pyrimidyl)-p-nitrobenzenesulfonamide is dissolved in 10 parts, by weight, of concentrated aqueous ammonia, and hydrogen sulfide is then passed into the solution for about two hours while maintaining a temperature of about 10–25° C. This clear solution is then heated for about one-half hour at about 100° C. (to drive off the bulk of the unused hydrogen sulfide and ammonia), cooled to R. T., treated with 123 ml. normal NaOH and filtered (to remove the sulfur by-product). The filtrate is acidified with dilute acetic acid to precipitate the crude, crystalline, yellow powder. When recrystallized from a mixture of alcohol and water, the monohydrate of N-(6-mercapto-4-methyl-2-pyrimidyl) - p-aminobenzenesulfonamide is produced in the form of lustrous, golden yellow flakes, which foams at about 117–118° C. and which melts (completely to a red oil) at about 205–210° C. (Its identity as the monohydrate is confirmed by an analysis of its carbon, hydrogen, and sulfur content.)

EXAMPLE 3

*Preparation of an S-bismuth derivative of N-(6-mercapto-4-methyl-2-pyrimidyl)-p-aminobenzenesulfonamide*

To 100 cc. of a 0.1 molar solution of N-(6-mercapto-4-methyl-2-pyrimidyl)-p-aminobenzenesulfonamide, prepared as in Example 2 in absolute alcohol, is added 33 cc. of a 0.1 molar solution of bismuth trichloride in propylene glycol. The yellow precipitate which forms is filtered off, washed with water and dried. The product is believed to have the formula

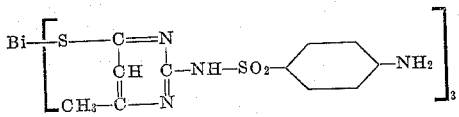

EXAMPLE 4

*Preparation of the disodium salt of an S-mercury-bis-derivative of N-(6-mercapto-4-methyl-2-pyrimidyl)-p-aminobenzenesulfonamide*

To 5 g. of the monohydrate of N-(6-mercapto-4-methyl-2-pyrimidyl)-p-aminobenzenesulfonamide, prepared as given in Example 2, in 159 ml. normal sodium hydroxide, is added dropwise, over a one-half hour period, a solution of 2.1 g. of mercuric chloride in 64 ml. 50% alcohol; and the yellowish-white precipitate of the mercury salt which forms is filtered off and washed free of chloride ion. This precipitate is then treated with sufficient dilute sodium hydroxide to dissolve almost all the solid, is filtered, the filtrate is concentrated to dryness in vacuo, and the product, a faintly yellow, fluffy powder, is obtained. The composition corresponds with that of the disodium salt of the mercury-bis derivative of N-(6-mercapto-4-methyl-2-pyrimidyl)-p-aminobenzenesulfonamide, and contains varying amounts of water (dependent upon the method of drying). Thus, a product dried in vacuo at room temperature for 24 hours had a composition corresponding with the tetrahydrate.

EXAMPLE 5

*Preparation of the sodium salt of the S-silver derivative of N-(6-mercapto-4-methyl-2-pyrimidyl)-p-aminobenzenesulfonamide*

157 mg. of the monohydrate of N-(6-mercapto-4-methyl-2-pyrimidyl)-p-aminobenzenesulfonamide is dissolved in 5 ml. normal sodium hydroxide, filtered to remove a small amount of insoluble material, and to the filtrate is added 81 mg. silver nitrate in 1 ml. water. A yellow precipitate of silver salt, which forms immediately, is filtered off, washed with water until free from nitrate ion and then treated with sufficient normal sodium hydroxide to dissolve it. When this solution is concentrated to dryness in high vacuo, a pale yellow, fluffy powder is obtained.

Manifestly a number and variety of other N-(C-mercaptopyrimidyl)-p-nitrobenzenesulfonamides (or corresponding acetamidobenzenesulfonamides) may be obtained by the procedure given in Example 1, using the appropriate alkali-metal hydrosulfide (including ammonium hydrosulfide) and the N-(C-halo-pyrimidyl)-p-nitrobenzenesulfonamide (or the corresponding p-acetamidobenzenesulfonamide) reactants (I). The following additional reactants (I), inter alia, may be used for the preparation of the compounds of this invention:

N-(5-bromo-4-methyl-2-pyrimidyl)-p-nitrobenzenesulfonamide, [J. A. C. S. 63: 3028 (41)]

N-(5-bromo-4,6-dimethyl-2-pyrimidyl)-p-nitrobenzenesulfonamide, [J. Org. Chem. 10: 327 (45)]

N-(5-chloro-2-pyrimidyl)-p-nitrobenzenesulfonamide, [J. A. C. S. 64: 567 (42)]

N-(2-chloro-5-pyrimidyl)-p-nitrobenzenesulfonamide, [J. A. C. S. 64: 567 (42)]

N-(2,4-dichloro-5-pyrimidyl)-p-nitrobenzenesulfonamide [prepared from N-(2,4-dihydroxy-5-pyrimidyl)-p-nitrobenzenesulfonamide (Brit. Pat. 555,865), by interaction with POCl₃]

Manifestly, a number and variety of other S-(heavy-metal) derivatives of [A] and salts of the derivatives may be obtained by the procedure given in Examples 3, 4, and 5, thus:

The gold derivative is prepared from bromauric acid and N-(6-methyl-4-mercapto-2-pyrimidyl)-p-aminobenzenesulfonamide (referred to hereinafter as II);

The copper derivative is prepared from cupric chloride and II;

The cobalt derivative is prepared from cobaltous chloride and II;

The nickel derivative is prepared from nickel chloride and II;

The iron derivative is prepared from ferric chloride and II;

The arsenic derivative is prepared from arsenous chloride and II;

The antimony derivative is prepared from antimony trichloride and II;

The cadmium derivative is prepared from cadmium trichloride and II.

The invention may be variously otherwise embodied within the scope of the appended claims.

We claim:

1. A compound of the general formula:

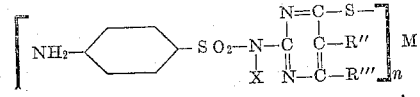

wherein X is a member of the class consisting of hydrogen and alkali-metal, M is a heavy metal of the class consisting of mercury, silver, gold, copper, cobalt, nickel, iron, arsenic, antimony, cadmium and bismuth, R'' and R''' are each members of the class consisting of hydrogen and lower alkyl, and $n$ is the valence of the metal M.

2. A compound as defined by claim 1, in which M is mercury.

3. A compound as defined by claim 1, in which M is silver.

4. The disodium salt of the S-mercury-bis-derivative of N-(6-mercapto-4-methyl-2-pyrimidyl)-p-aminobenzenesulfonamide.

5. The sodium salt of the S-silver derivative of N-(6-mercapto-4-methyl-2-pyrimidyl)-p-aminobenzenesulfonamide.

WILLIAM A. LOTT.
FRANK H. BERGEIM.

References Cited in the file of this patent

UNITED STATES PATENTS

| Number | Name | Date |
|---|---|---|
| 2,410,793 | Winnek et al. | Nov. 5, 1946 |
| 2,430,439 | Winnek et al. | Nov. 4, 1947 |

FOREIGN PATENTS

| Number | Country | Date |
|---|---|---|
| 589,040 | Great Britain | June 10, 1947 |